United States Patent Office 2,748,824
Patented June 5, 1956

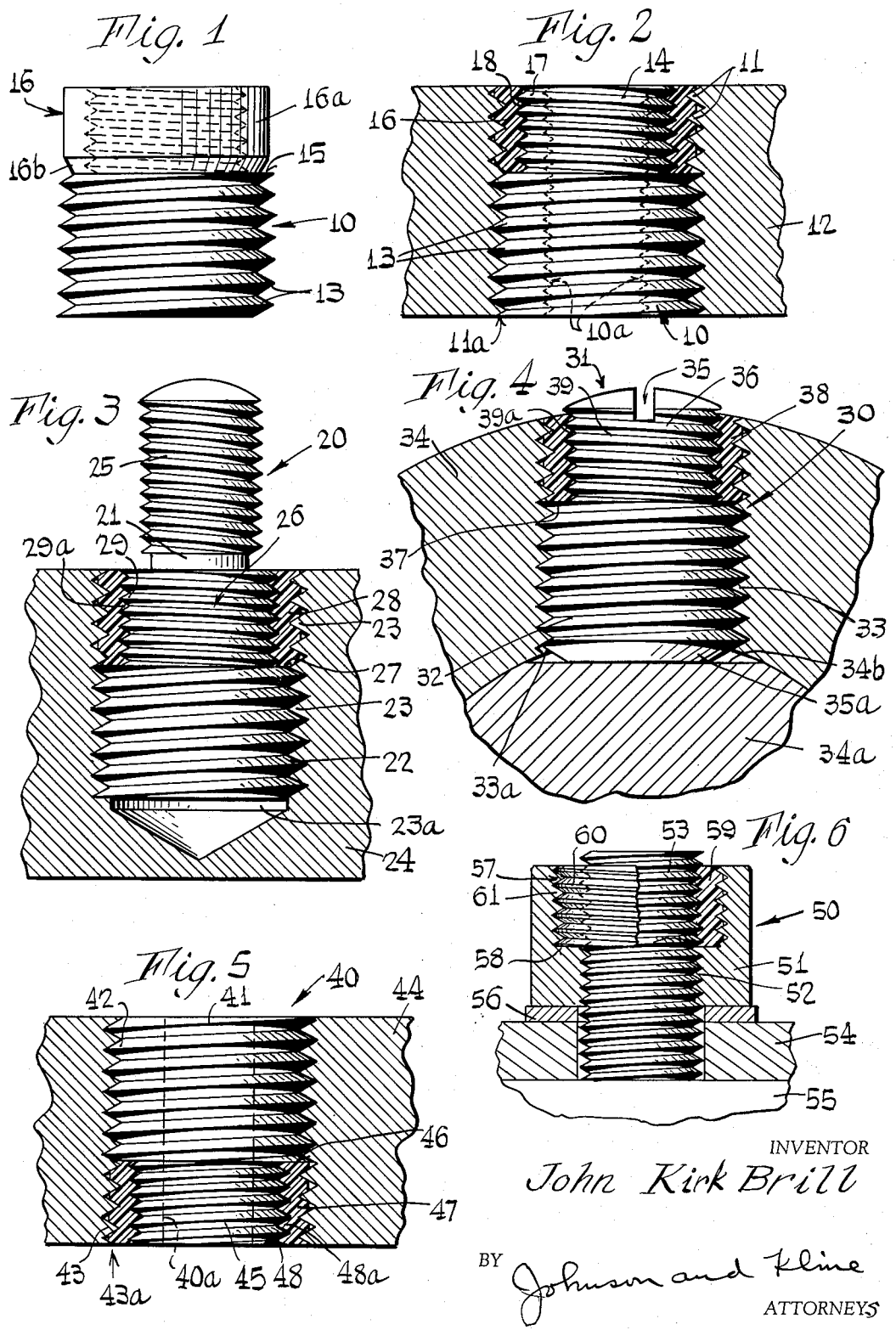

2,748,824

THREADED MEMBERS CARRYING RESILIENT DEFORMABLE LOCKING INSERTS THEREON

John K. Brill, Jamestown, N. Y.; Adelaide E. Brill, administratrix of said John K. Brill, deceased Application February 3, 1953, Serial No. 334,942

1 Claim. (Cl. 151—7)

This invention relates to self-locking threaded members and particularly to that type of member in which an insert is provided and adapted to be deformed during the threading-on operation to provide a friction grip to prevent inadvertent loosening of the member.

Heretofore, in efforts to mount inserts on threaded members difficulty has been encountered in that the inserts have broken free, stripped or pealed off the threaded member even in cases where keyways or the like had been used. This is due to the fact that as the threaded member is threaded into a threaded hole it moves in easily until an insert engages the thread in the hole, whereupon substantial torque is required to turn the threaded member into the hole as the threads in the hole form cooperating threads on the insert. This increased frictional resistance to turning encountered when the insert meets the threads tends to cause relative rotation between the threaded member and the insert which may break the insert loose and even shear off the keyways. Also there is a longitudinal thrust produced as the threaded member moves in easily while the insert tends to move more slowly over the threads causing a longitudinal stripping of the insert.

The present invention overcomes these difficulties by utilizing the tendency to relative rotation between the member and the insert to cause the insert to be jammed tightly on the member and eliminate any subsequent relative turning of the insert on the member and also eliminate any stripping of the insert from the member.

This is accomplished, according to the present invention, by providing the threaded member with a shouldered insert-receiving portion having an insert and providing on the insert-receiving portion cam means or threads cooperating with cam means or threads on the insert to utilize the relative movement between the member and insert to draw the insert into jammed relation with the shoulder. If the insert is one which follows the threaded member into the hole, the threads on the insert-receiving portion are of an opposite hand to the threads in the hole so that the relative rotation of the insert on the member in the opposite direction tends to jam the insert against the shoulder. If the insert is a leading insert, then the threads on the insert are of the same hand as the threads on the member and tend to jam the insert against the shoulder on the member.

The present invention has wide application since it may be utilized to lock threaded sleeves in a hole, which sleeves are adapted to receive threaded studs, bolts, or the like; it can be used on threaded studs adapted to be threaded in a hole on a member; it can be used in conjunction with a set screw to lock it in position against unintentional movement; it can be used to lock threaded bushings in a member; and also it can be used in connection with a lock nut to lock the nut against unintentional movement.

A feature of the invention resides in the fact that as the insert is jammed against the shoulder on the member compressive forces are set up in the insert due to the threaded connection between the insert and member which tend to expand the insert and produce a strong frictional lock between the member carrying the insert and the cooperating threads.

Another feature of the invention resides in the fact that the threaded member with the insert may be inserted and removed from the threaded hole repeatedly for a great number of times without loss of the locking feature.

Other features and advantages will be apparent from the specification and claim when considered in connection with the drawings in which:

Figure 1 shows a threaded sleeve having the insert thereon.

Fig. 2 shows the threaded sleeve mounted in a threaded hole and having a threaded bore to receive a stud or bolt.

Fig. 3 shows a threaded stud having the locking means thereon.

Fig. 4 shows a set screw having the locking means thereon.

Fig. 5 shows a threaded bushing having the locking means thereon.

Fig. 6 shows a section of the lock nut having the locking means of the present invention.

In the illustrated form of the invention shown in Figs. 1 and 2 the threaded member comprises a sleeve 10 of suitable material adapted to be threaded into threads 11 in a hole 11a in a plate 12 or the like and has a threaded bore 10a to receive a stud, bolt or the like (not shown). The sleeve is provided on its outer surface with threads 13. Adjacent one end the sleeve has a portion 14 of reduced diameter forming an insert-receiving portion having a shoulder 15. A cylindrical insert 16 of a suitable resilient material capable of having a thread formed or cut therein by the threads into which it is turned is mounted on this portion and has a smooth outer surface 16a having an outside diameter which is slightly less than the outside diameter of the threads 13 as shown in Fig. 1. If desired it may also have a chamfered edge 16b to aid in starting a thread thereon.

The insert materials may be nonmetallic, for example, fiber, phenolic, Teflon (polymerized tetrafluoro ethylene), nylon and the like plastics, as the use of the threaded member may require. If the device is to be subjected to high temperatures which would damage the nonmetallic inserts, relatively soft metallic inserts may be used so that the harder threads 11 of the hole 11a will cut or deform the insert to produce locking threads thereon.

In connecting the insert to the reduced portion of the sleeve, according to the present invention, means are used which will cause the insert to jam against the shoulder 15 as the sleeve is threaded into position. While this means may be in the form of a cam or the like, in the illustrated preferred form of the invention it comprises threads 17 on the reduced portion cooperating with threads 18 on the inner surface of the insert.

In the form of the invention shown in Fig. 1 the insert is arranged to be a following insert. Therefore, the threads 17 on the reduced portion of the sleeve are of opposite hand from the threads 13, i. e. threads 13 are illustrated as right-hand threads while threads 17 on the reduced portion are left-hand threads. It will be seen that as the sleeve and assembled insert is threaded into the tapped hole 11a in a clockwise direction it will move in readily since the threads on the sleeve and the threads 11 in the plate are of the same construction. However, as soon as the insert 16 engages the threads 11 in the hole, it is necessary to utilize increased torque to drive the threaded sleeve into the hole since the outer surface of the insert must be deformed to conform to the threads 11 in the hole. This increased resistance produces a tendency for the insert to move in a counterclockwise direction with respect to the sleeve. Since the threads on the reduced portion are a left-hand thread, this will cause the insert to be moved downwardly with respect to the threaded sleeve and jam against the shoulder 15 which will tend to retard further rotation of the insert on the sleeve and the two will rotate together to be threaded into the hole 11a with the insert receiving the threads of the hole as it is threaded therein. Further, as the insert is jammed into engagement with the shoulder this action will tend to compress the insert so that it will expand laterally and apply a radial pressure or wedging action on the threads 11 to assist in frictionally holding the insert against unintentional removal. It will be noted that the threads 17 not only function to jam the insert to resist relative rotation but at the same time act to prevent any pealing or stripping of the insert from the threaded sleeve.

In Fig. 3, the present invention is illustrated as being applied to a threaded stud 20 comprising a body 21 having a threaded section 22 adapted to be threaded into the threads 23 in hole 23a in a plate 24 and has a projecting threaded stud portion 25 projecting from the plate. The body has a portion 26 of reduced diameter adjacent the threaded section forming an insert-receiving portion having a shoulder 27.

An insert 28 similar to that shown in Fig. 1 is positioned on the insert-receiving portion 26 and since it too is a following insert it is connected to the reduced portion by threads 29 on the reduced portion cooperating with threads 29a on the insert which are of an opposite hand to the threads on the threaded section 22.

When the stud is threaded into the hole 23a, it turns in easily until the insert engages threads 23 whereupon any relative rotative movement of the insert on the stud due to increased drag on the insert as the threads are formed in the outer surface causes the insert to be jammed against the shoulder and as the stud is driven home in the hole it will be locked against unintentional removal in a manner similar to that set forth in connection with sleeve 10.

The present invention also is of value when used with a set screw 30 for it holds the screw in position without requiring the screw to be driven into clamping relation with the cooperating member. As shown in Fig. 4, the set screw comprises a body 31 having a threaded section 32 adapted to be threaded into threads 33 in a hole 33a in a collar 34, for example, which is to be held on a shaft 34a.

The body has a kerf or tool receiving portion 35 at one end by which it is turned into set position and a shaft engaging portion 35a at the other end. The body is provided adjacent the kerfed end with a portion 36 of reduced diameter forming an insert-receiving portion having a shoulder 37. An insert 38 similar to that shown in Fig. 1 is positioned on the insert-receiving portion and since it too is a following insert it is connected to the reduced portion by threads 39 on the reduced portion cooperating with threads 39a on the insert which are of an opposite hand to the threads on the threaded section 32.

When it is desired to utilize the set screw, the assembled unit is threaded into the hole 33a and turns in easily until the outer surface of the insert engages the threads 33 whereupon any relative movement of the insert on the screw causes the insert to be jammed against the shoulder and as the screw is turned to its position it will be locked against unintentional removal due to the frictional grip of the insert on threads 33 in the manner set forth in connection with sleeve 10. It will be apparent, therefore, that with the set screw so locked in the hole it will not be necessary to jam the screw tightly against the surface 34b on the shaft so as to prevent vibration or the like from unintentionally causing a set screw to be released.

The invention is shown in Fig. 5 as being applied to a bushing 40 having a smooth bore 40a therethrough. The bushing comprises a body 41 having a threaded section 42 adapted to be threaded into threads 43 in a hole 43a in a plate 44. The body at the leading end thereof has a portion 45 of reduced diameter forming an insert-receiving portion having a shoulder 46. An insert 47 similar to that shown in Fig. 1 is positioned on the insert-receiving portion 45 and is connected to the reduced portion by threads 48 on the reduced portion cooperating with threads 48a on the insert. Since it is a leading insert, i. e., an insert arranged to engage the threads in the hole prior to the threaded section of the bushing, the threads 48, 48a are of the same hand as the threads on the section 42.

When the bushing is inserted into the plate the insert 47 will first engage the threads and will not move freely into the hole due to the torque required to form the threads in the outer surface of the insert by the threads in the hole. Since the bushing is being turned with a clockwise direction, any tendency toward relative rotation between the insert and the bushing will cause the right-hand threads on the reduced portion and the insert to cooperate and jam the insert against the shoulder 46 on the bushing, thus retarding relative rotation and at the same time preventing stripping, pealing or the like of the insert from the bushing.

In Fig. 6 the invention is shown as applied to a lock nut 50 comprising a body 51 having a threaded section 52 adapted to be threaded onto a bolt 53 for clamping a plate 54 to a member 55 with a washer 56 interposed between the nut and the plate. The nut in the outer portion thereof is provided with an enlarged bore 57 forming an insert-receiving portion having a shoulder 58. An insert 59 is positioned in the insert-receiving portion and has a bore therethrough having an internal diameter slightly larger than the internal diameter of the threads on the threaded section 52.

Since the insert is a following insert it is connected to the nut by means of threads 60 cooperating with threads 61 on the nut, which threads are of an opposite hand to the threads on the threaded section 52.

As the nut is applied to the bolt 53, it will go on easily as the threaded section 52 is threaded thereon and until the insert 59 engages the threads on the bolt. Thereafter, additional torque must be applied so that the threads of the bolt will deform the inner bore of the insert and form cooperating threads thereon. Any tendency toward relative rotation between the nut and insert will cause the threads 60, 61 to jam the insert against the shoulder 58 and retard it from continued relative rotation. Further, the jamming action of the insert will cause compressive forces to be set up in the insert which will cause the insert to expand radially inwardly and wedge against the threads on the bolt to obtain a secure frictional lock which will hold the nut against unintentional movement, such as by vibrations or the like.

From the foregoing, it will be seen that by the present invention I have provided a locking means which utilizes any rotation of the insert with respect to the threaded body to jam the insert against a shoulder on the threaded body so as to resist such rotation.

Furthermore, by using a thread, which is in effect an elongate cam, I have been able to secure a greater holding action between the insert and the threaded body which will prevent stripping or pealing of the insert from the body.

The device of the present invention having the insert jammed against the shoulder may be removed and replaced numerous times without damaging the threads on the insert and without reducing their effectiveness in locking the threaded member against unintentional movement.

Variations and modifications may be made within the scope of the claim and portions of the improvements may be used without others.

I claim:

A self-locking threaded member comprising a body having right hand threads on a portion of its outer surface screwed into a threaded hole, in a second member a portion of reduced diameter removed from the end of the member first to enter the hole, such portion of reduced diameter having left hand threads and extending without enlargement to the other end of the member, an insert of average outside diameter less than the outside thread diameter and greater than the average of the inside and outside thread diameter of the right hand threads on said member, said insert having internal left hand threads and being screwed on to the left hand threads of said member and being formed of displaceable resilient material screwed into and jammed in the hole for locking said member and means accessible from the reduced diameter end of said first member for driving engagement by a driving element.

References Cited in the file of this patent

UNITED STATES PATENTS

| | | |
|---|---|---|
| 1,077,119 | Bixby | Oct. 28, 1913 |
| 1,160,932 | Mendelson | Nov. 16, 1915 |
| 1,567,413 | Cubitt | Mar. 9, 1926 |
| 1,651,268 | Gilmour | Nov. 29, 1927 |
| 2,398,838 | Miller et al. | Apr. 23, 1946 |
| 2,450,694 | Sauer | Oct. 5, 1948 |
| 2,520,121 | Brutus | Aug. 29, 1950 |